Oct. 14, 1941.  W. C. IFTIGER, SR  2,259,137
COUPLING
Filed Aug. 14, 1939
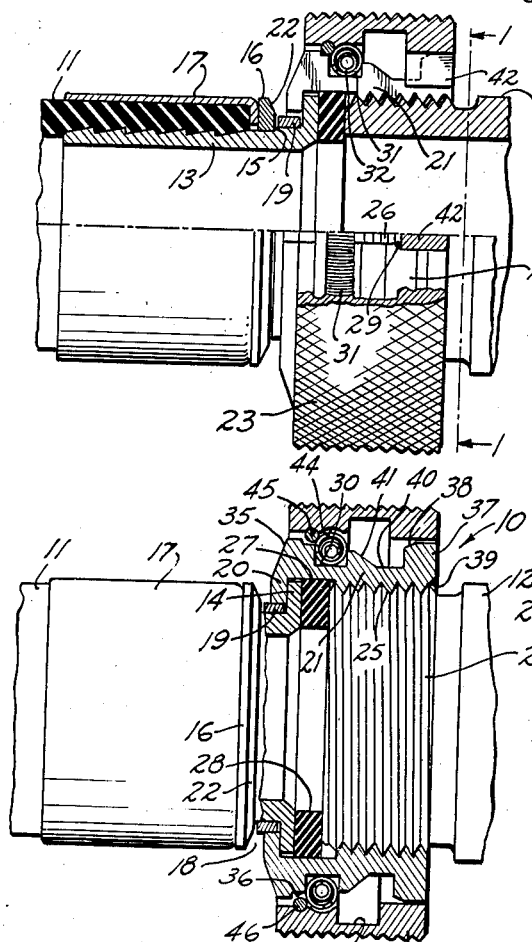
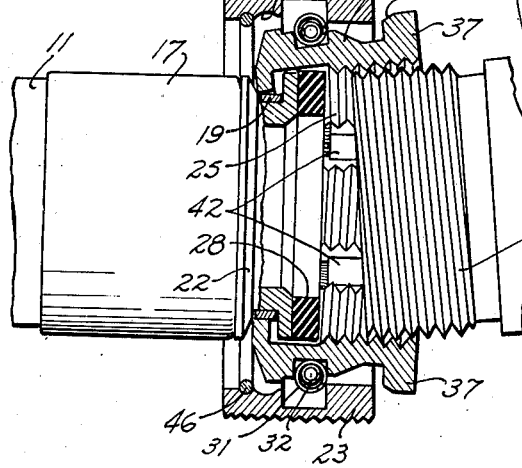
INVENTOR.
William C. Iftiger, Sr.,
BY Russell L. Ott
ATTORNEY.

Patented Oct. 14, 1941

2,259,137

UNITED STATES PATENT OFFICE 2,259,137

COUPLING

William C. Iftiger, Sr., Santa Fe Springs, Calif.

Application August 14, 1939, Serial No. 289,965

7 Claims. (Cl. 285—150)

This invention relates to a coupling, and has a particularly important application in the coupling of a hose or fluid conduit to a faucet, pipe, or other fluid conducting means.

It is an object of my invention to provide a coupling which can be conveniently and rapidly connected and disconnected.

An object of my invention is to provide a threaded female coupling member which is adapted to be connected and disconnected to a threaded male member much more quickly than has heretofore been possible.

Another object is to provide a threaded female coupling member adapted to be connected to a threaded male member such as the outlet of a faucet, a pipe, or the like, by simply pushing the female member over the threads of the male member and to be tightened to make a fluid-tight connection by turning the female member through not more than one turn.

Another object of the invention is to provide a threaded female coupling member that can be partially engaged upon a threaded male member at an angle and quickly aligned to the threads thereof.

Another object is to provide a threaded female coupling member adapted to make a fluid-tight connection with a threaded male member and to be securely held in coupled relation therewith against any accidental uncoupling, but which is adapted to be disconnected from the male member by simply turning the female member through a small angle and pulling it straight off or off at an angle.

Another object is to provide a quickly connectible threaded coupling that can be readily converted into a common screw type coupling by simply moving a sliding collar of the device to its forward stop and leaving it in this position.

Another object is to provide a quickly connectible threaded coupling that has the strength of a common screw type coupling having the same number of threads of the same dimension, but which requires only one turn in making a tight connection.

Still another object of the invention is to provide a coupling that is adapted for cheap manufacture on a large production basis, that is dependable in its operation, and is durable and of long life.

These and other apparent objects are attained in a manner that will be clear from consideration of the following description taken in connection with the accompanying drawing, of which:

Fig. 1 is a sectional end view of the coupling of my invention with the female coupling member in tightened coupled relation with a threaded male member, the section being taken on the line 1—1 of Fig. 2.

Fig. 2 is a partial sectional view of my coupling taken on the line 2—2 of Fig. 1.

Fig. 3 is a cross-sectional view taken on a plane through the jaws of my coupling and showing my threaded female coupling member being pushed over a threaded male member disposed at an angle relative thereto, in the act of coupling the male and female members.

Fig. 4 is an end sectional view of my coupling with the female member in position over the male member, and with the parts in position for, but prior to tightening.

Fig. 5 is a cross-sectional view of the coupling under conditions corresponding to those of Fig. 4, and taken on a line 5—5.

Fig. 6 is a view in perspective of one of the threaded jaws forming part of my female coupling member.

While the coupling of my invention is adapted to connect a member of any character to any threaded male member of suitable dimensions, whether or not the members to be connected are provided with fluid passages therethrough, I have chosen to disclose herein that important embodiment of my invention in which a threaded female member 10 having a fluid passage therethrough is rotatably connected to a fluid conduit 11 in the form of a rubber hose and is adapted to be coupled to a threaded male member 12 having a fluid passage therethrough and which may constitute the connecting part of a valve or faucet, or the end of a pipe or hose, or the like.

The female coupling member 10 is preferably connected to the hose 11 by means of a tubular part 13 which is inserted into the hose and has a ridged exterior adjacent its entering end for retaining the hose. At its other end the part 13 is formed with a radially outwardly directed flange 14. At a short distance along the tubular part 13 to the rear of the flange 14, a shoulder 15 is formed in the exterior of the part 13, against which a ring 16 abuts. A ferrule 17 covers the end of the hose 11 and engages the ring 16, the ferrule 17 and the ring 16 being held firmly in assembled condition by engagement of the tubular part 13 with the inner surface of the hose 11.

The ring 16 and the flange 14 define an annular groove 18 surrounding the tubular part 13 for the reception of inwardly directed flanges 20 of a plurality of independently movable jaws 21. The upper portion of the side of the ring 16 is beveled at 22 facing the groove 18 to facilitate deflection of the jaws 21 about the inner and rearward edge of the flanges 20 when the bevel 22 is forced against this edge; and the groove 18 is made wider than the flanges 20 in order to avoid any obstruction to the deflection of the jaws. A rotatable ring 19 is preferably positioned with clearance within the groove 18 surrounding the tubular part 13 to facilitate rotation of the jaws 21 around the part 13 within the groove 18. The jaws 21 are arcuate in shape and are disposed concentrically within a collar 23, the jaws being circumferentially spaced from one another so as to provide slots 24 therebetween. The interiors of the jaws 21 are threaded at 25 to match in radius, pitch, and shape the threads 26 on the exterior of the male member 12. The rearmost portions of the interior surfaces of the jaws 21 adjacent the flange 14 are recessed at 27 to accommodate a flexible washer 28 and to retain it in position adjacent the flange 14. One edge of each of the jaws 21 lying on that side of the adjacent slot 24 which is in the direction toward which the collar is rotated in tightening the coupling is shaped to form a cam face 29 in such manner that the rear portions of the slots 24 are narrower than the forward portions thereof. When the coupling, such as that illustrated, is provided with right-hand threads, the cam face 29 is on the side of the jaw 21 lying on that side of each slot 24 which is most advanced in a counter-clockwise direction in Fig. 1.

In the exterior of the jaws 21 is a groove 30 longitudinally positioned in a suitable location on the opposite side of the flange 14 from the flanges 20. Within this groove 30 is a closely wound closed coil spring 31 which extends entirely around all of the jaws 21 and urges the jaws 21 radially inward, the tension of the spring 31 being such as to permit each jaw 21 to yield outwardly independently of the other of the jaws 21. To reinforce the spring 31 and to prevent its collapse during those stages in the operation of the coupling when the spring is under stress, a second closely wound coil spring 32, preferably wound in the opposite direction to the spring 31, is inserted within the spring 31. The spring 32 does not have its ends joined and therefore does not influence the force required to circumferentially stretch the spring 31; but its ends are relatively close together and its outer diameter is only a little smaller than the inner diameter of the spring 31 so as to provide efficient lateral reinforcement for the spring 31.

The rear wall of each of the jaws 21 may be beveled at 35. On the exterior surface of the jaws between the walls 35 and the groove 30 is a shallow and narrow groove 36, for a purpose hereinafter explained, the forward wall of the groove 36 being formed by the rear side of the coil spring 31. Each of the jaws 21 terminates at its forward end in an outwardly directed flange 37 having its rear corner beveled at 38 to facilitate sliding the collar 23 over the jaws 21. The inner and forward edge of each of the jaws 21 is beveled at 39 to facilitate entrance of the male member between the jaws. Adjacent the flanges 37 is a groove 40 adapted to provide clearance for the forward end of the collar 23 when the jaws 21 are deflected outwardly and the collar 23 is in its rearmost position. The rear wall of the groove 40 is inclined at 41, providing additional clearance but retaining a considerable radial thickness of metal in the jaw to the rear of the groove 40.

The collar 23 is preferably formed with a knurled exterior and carries at its forward end inwardly directed lugs 42 disposed within the slots 24 between the jaws 21 and preferably extending rearwardly substantially to the beginning of the cam faces 29 when the collar is in its most forward position. The bore of the lugs 42 is preferably larger than the outside diameter of the threaded portion of the male member for which the coupling is adapted, so as to permit the coupling, when the collar 23 is in its rearmost position, to be entered upon or pulled off of the threads of the threaded male member at an angle thereto. An internal groove 43 preferably of width greater than the diameter of the spring 31 is located in the collar 23 to the rear of and adjacent to lugs 42 to provide clearance for the spring 31 when the collar 23 is in its rearmost position, with the lugs 42 against the spring 31, and when the jaws 21 are deflected outwardly. An internal radius groove 44, corresponding in radius approximately to the coil spring 31, is located in the collar 23 in alignment with the spring 31 when the collar 23 is at its forward stop. Another internal groove 45, semi-round in shape, is located in the collar 23 in alignment with the groove 36 on the jaws 21 when the collar 23 is at its forward stop, and a spring wire 46, of greater natural diameter than the inside of the collar 23, is received in the groove 45 and acts as a forward stop for the collar 23 by engaging the rear side of the spring 31 when the collar 23 is moved in a forward direction. The inside dimensions of the collar 23 are preferably such that when the female member 10 is installed on the male member 12 prior to tightening the coupling, as in Fig. 5, the forward end of the collar has clearance over the periphery of the flanges 37, the collar may readily be slid over the coil spring 31, and the spring wire 46 has clearance over the periphery of the jaws 21 adjacent the groove 36, in such manner that the collar 23 is freely movable to and fro over the jaws 21, but the outward expansion of the jaws 21, when the collar 23 is at its forward stop, is restricted to preferably much less than the depth of the threads 25 and 26.

The operation of the coupling will now be described. Assume that it is desired to connect the female member 10 to the male member 12. The collar 23 is first moved to its rearmost position in which the rear side of the lugs 42 engage the coil spring 31. Since the spring 31 is laterally reinforced by the inner spring 32 there is no danger of crushing the spring 31 when force is exerted rearwardly on the collar 23. In moving the collar 23 to its rearward stop the lugs 42 pass rearwardly along the slots 24, in constant engagement with the jaws 21, on either side, engage the cam faces 29 and circumferentially spread each pair of jaws 21 by an amount equal to the circumferential rise of each cam face 29. With the collar 23 in the rearmost position, it will be seen that the spring 31 urges the jaws to their innermost positions, the forward positions of the jaws being prevented from collapsing by engagement of the edges thereof with the interposed lugs 42, and the rear portions of the jaws being supported by engagement of the flanges 20 with the ring 19. The dimensions of the jaws 21 and the lugs 42 are preferably such that with the collar 23 in its rearmost position the jaws 21 form arcs of a common circle and the threads of the jaws substantially match in diameter the threads of the male member 12. The coupling is now ready to connect to the male member.

In making the connection, it is only necessary to grasp the hose 11 and force the female member over the male member 12. The connection can be made with the two members in alignment or with them at an angle to one another. Fig. 3 illustrates the conditions existing at one stage in the act of making the connection when the female member is forced over the male member at an angle thereto. The jaws 21 are thrust rearwardly to engage the ring 16 and are then deflected outwardly, fulcruming about the point of contact of the end of the flange 20 with the ring 19 and the ring 16. It will be observed that the entering faces of the threads on the male member are engaged by the forward faces of the threads of the jaws 21 and that since both faces are sloping, the jaws are forced outwardly by the pressure of this contact. The jaws are also urged outwardly by the axial force exerted upon the threads 25 of the jaws, which force, acting around the fulcrum point of the jaws located radially inward from the line of action of said force, produces an outward turning moment on the jaws 21. When the jaws 21 are deflected outwardly, the spring 31 is also carried outwardly into the clearance groove 43, the groove 40 on the jaws providing ample clearance for the forward end of the collar 23. As the coupling is forced further over the male member 12 the threads 25 of the jaws ride over the threads 26 of the male member, and eventually the washer 28 is engaged by the end of the member 12. The coupling may then be brought into alignment with the member 12. If any difficulty is had in aligning the threads, the collar 23 is turned in a clockwise direction (for right-hand threads) as seen from the left side of Fig. 3, causing the threads of the jaws to ride over the threads of the male member until the jaws automatically fall into the correct positions. Ordinarily the jaws 21 assume their correct positions in matched engagement with the threads of the member 12 without any rotation of the collar being required, the jaws being urged to their positions by the coil spring 31. It will be obvious how the jaws of the coupling expand and ride over the threads of the male member when the member 10 is forced straight over the male member instead of being entered thereupon at an angle thereto, as above described.

When the coupling has been forced over the member 12 until the member 12 abuts the washer 28 and the jaws 21 are in threaded engagement with the member 12, the collar 23 is then moved in a forward direction as far as it will go, being limited in its forward travel by engagement of the spring wire 46 with the coil spring 31. The conditions then existing are those illustrated in Figs. 4 and 5. It will be seen that the member 12 abuts the washer 28 and that the forward portions of the jaws 21 are in threaded engagement with the member 12. The flanges 20 rest on the ring 19 to support the jaws at the rear. There is clearance between the lugs 42 and the jaws 21 on the same sides of the slots 24 as the cam faces 29 until the collar 23 is turned to tighten the coupling.

To make the connection fluid tight, the collar 23 is turned in a counter-clockwise direction (for right-hand threads) in Fig. 1, bringing the lugs 42 into engagement with the opposite walls of the slots from those in engagement with the lugs under the conditions of Fig. 4. In this condition the collar is prevented from accidentally being moved to a rearward position during the tightening of the coupling, by reason of the presence of the cam faces 29 in the path of the lugs 42. Further turning of the collar 23 in the same direction rotates the jaws 21 and tends to screw the member 12 further into the jaws, but since the travel of the member 12 into the coupling is limited by the washer 28, and the forward movement of the jaws is restricted by engagement of the flanges 20 with the flange 14, the only result can be the riding up of the jaws 21 on the threads of the member 12. In this action the rear faces of the threads of the jaws are the ones in engagement with the threads of the male member 12. As a result, then, of turning the collar 23 as described, the jaws 21 are expanded outwardly into the positions shown in Figs. 1 and 2, wherein the peripheries of the flanges 37 are forced against interior surfaces of the collar 23; the flanges 20 are raised out of contact with the ring 19; the spring 31 is clamped within the groove 30 on one side and the groove 44 on the other side; and the inner diameter of the spring wire 46 lies in contact with the bottom of the groove 36 of the jaws, thereby protecting the adjacent coil spring 31 against excessive pressure which might otherwise damage the spring during the tightening operation.

Ordinarily, considerably less than a single turn of the collar is required to tighten the coupling. It will be seen that, following rotation of the collar and tightening the coupling, as described, the male member 12, the washer 28, and the tubular part 13 are all held tightly together to make a fluid-tight connection, and that all of the parts of the coupling are tightly locked in position against accidental uncoupling. The jaws 21 cannot move rearwardly because of engagement with the threads of the member 12 and cannot move forward because of engagement of the flanges 14 and 20. The collar 23 cannot move forward relative to the jaws because of engagement of the spring wire 46 with the coil spring 31, and cannot be moved rearwardly because of engagement of the wall of the groove 44 with the coil spring 31 and because of engagement of the spring wire 46 with the rearward wall of the groove 36. Moreover, the cam faces 29, by engagement with the lugs 42, prevent the collar 23 from being moved rearwardly until the collar is rotated clockwise in Fig. 1. Because of the friction between the collar 23 and the parts in engagement therewith in the tightened condition of the coupling, even rotation of the collar requires deliberate exertion of force.

In disconnecting the coupling, the collar 23 is first rotated in a clockwise direction in Fig. 1 a sufficient amount to permit the jaws 21 to be contracted by the coil spring 31 to the positions shown in Fig. 5 and to align the lugs 42 with the rear portions of the slots 24. The collar 23 is then moved rearwardly to its rearward stop, with the lugs 42 in engagement with the spring 31. In this condition the female member 10 may be pulled straight off of the member 12 by the sliding collar or it may be removed by exerting a transverse breaking force on the female member or the member 12. In this action it will be clear how the rear faces of the threads of the jaws 21, by engagement with the threads of the male member, primarily the first two or three threads thereof, causes the jaws 21 to deflect outwardly and to ride over the threads of the member 12. After removal of the female member 10 the jaws will be found to be in substantially the condition illustrated in Fig. 5, even though the male member 12 is not enclosed by them, for the lugs 42, by engagement with the edges of the jaws, prevent the collapse of the jaws. The collar 23, of course, is at the rearward stop instead of at its forward stop as in Fig. 5. In this condition it is ready to be reconnected to the member 12, if desired, after the manner previously described.

If desired, my coupling may be employed as a common screw type coupling by moving the collar 23 to its forward stop, as in Fig. 5, and simply screwing the entire female member on the member 12 until a tight connection is effected.

It will be seen that the coupling of my invention provides the utmost convenience in connecting to a threaded male member and in disconnecting therefrom. An important advantage of my coupling over other quickly connectible and releasable couplings is that it operates in conjunction with a standard threaded male member and requires no change in, or addition to, the male member to which it is to be connected. This feature is of great commercial advantage because generally, as when used on a garden hose, it is desired to attach the female coupling member to any one of a number of outlets, and my coupling eliminates the necessity of supplying special male outlet members and the inconvenience of attaching such members on the standard outlets available. It has been found that no damage is done either to the threads of the jaws of my coupling or to the threads of the male member by pushing on and pulling off my coupling, and it is found that the coupling is entirely dependable in operation and is sturdy and durable in use.

It will be obvious that my coupling can be adapted to use wherein a metal to metal fluid seal is required by dispensing with the flexible washer 28 and by forming a suitable seat on the forward end of the part 13 and a suitable sealing surface on the end of the member 12 for engagement therewith. It will be understood that various other changes and modifications in design and construction of my coupling may be made by those skilled in the art without departing from the spirit and scope of the invention defined in the appended claims.

I claim as my invention:

1. A coupling for connection with a threaded male member, comprising: a plurality of internally threaded jaws rotatable about the axis of said coupling and independently movable in a radial direction; walls forming an external groove on said jaws; a spring surrounding said jaws and disposed in said groove, said spring urging the forward ends of said jaws radially inward; and an axially movable collar surrounding said jaws and adapted in one position to permit said jaws to be deflected outwardly over the threads of said male member, and in another position to restrict the outward deflection of said jaws.

2. A coupling for connection with a threaded male member, comprising: a plurality of internally threaded jaws rotatable about the axis of said coupling, each of said jaws being wholly movable in a radial direction independently of the other of said jaws; means resiliently urging the forward ends of said jaws radially inward; and means adapted in one position to permit said jaws to expand outwardly over the threads of said male member, and in another position to rotatively engage said jaws and to restrict the outward movement of said jaws to less than the depth of said threads, in such manner that rotation of said last-mentioned means in a direction tending to screw said coupling onto said male member effects tightening of said coupling.

3. A coupling for connection with a threaded male member, comprising: a plurality of internally threaded jaws rotatable about the axis of said coupling and independently movable in a radial direction; means resiliently urging said jaws radially inward; and a member surrounding said jaws and carrying lugs interposed between said jaws to circumferentially space said jaws apart, said member being axially movable and being adapted in one axial position to permit said jaws to expand outwardly over the threads of said male member, and in another axial position to restrict the outward movement of said jaws in such manner that rotation of said member in a direction tending to screw said coupling onto said male member effects tightening of said coupling.

4. A coupling for connection with a threaded male member, comprising: a plurality of internally threaded arcuate jaws rotatable about the axis of said coupling and independently movable in a radial direction; a spring surrounding said jaws and urging said jaws radially inward; and a collar surrounding said jaws and carrying lugs interposed between said jaws to circumferentially space said jaws apart and limit their inward movement, said collar being axially movable to a rearward position determined by engagement of said lugs with said spring and in which position said jaws are permitted to expand outwardly over the threads of said male member, and said collar being axially movable to a forward position in which outward expansion of said jaws is restricted in such manner that rotation of said collar and said jaws in a direction tending to screw said coupling onto said male member effects tightening of said coupling.

5. A coupling for connecting a first member with a second externally threaded member, said first member being provided with an external groove; a plurality of internally threaded jaws having at their rear ends flanges rotatably disposed in said groove; means resiliently urging the forward ends of said jaws radially inward; and an axially movable collar surrounding said jaws and adapted in one axial position to permit said jaws to be deflected outwardly over the threads of said second member, and in another axial position to restrict the outward deflection of said jaws in such manner that rotation of said jaws in a direction tending to screw said coupling onto said second member tightens said coupling.

6. A coupling for connecting a first member with a second member, said second member being externally threaded, comprising: walls forming an external groove on said first member, a plurality of circumferentially spaced arcuate internally threaded jaws having their rear portions flanged and located within said groove; walls forming an external groove on said jaws; a coil spring disposed within said groove and urging said jaws radially inward; an axially movable collar carrying lugs extending inwardly into the spaces between said jaws, said collar having an internal groove disposed to the rear of said coil spring; a spring wire located within said last-mentioned groove, providing by engagement with said coil spring, a forward stop for said collar;

said collar restricting outward movement of said jaws when said collar is in its most forward position.

7. A coupling for connection with a threaded male member, comprising: a plurality of internally threaded jaws rotatable about the axis of said coupling and independently movable in a radial direction, said jaws being circumferentially spaced from one another to provide slots therebetween; means resiliently urging said jaws radially inward; an axially movable collar surrounding said jaws and carrying at its forward end lugs extending into said slots, said collar when in its rearmost position providing clearance to permit said jaws to expand radially outward, but in its most forward position restricting outward movement of said jaws; and an abutment limiting travel of said male member into said coupling; one of the walls of each of said slots having a portion angularly inclined to the axis of said coupling in such manner that each of said slots is narrower in its rearward portion than in its forward portion, and the wall having the inclined portion being on that side of the slot which is engaged by the adjacent one of said lugs when said collar is rotated in a direction tending to screw said coupling onto said male member.

WILLIAM C. IFTIGER, Sr.